United States Patent [19]
Cowland et al.

[11] 3,790,393
[45] Feb. 5, 1974

[54] CARBONACEOUS BODIES

[75] Inventors: Frederick Claud Cowland; Harry Appleby, both of Towcester, England

[73] Assignee: Beckwith Carbon Corporation, Van Nuys, Calif.

[22] Filed: Jan. 20, 1972

[21] Appl. No.: 219,521

Related U.S. Application Data

[63] Continuation-in-part of Ser. No. 59,017, July 28, 1970, abandoned.

[30] Foreign Application Priority Data

July 31, 1969 Great Britain.................... 38458/69
Nov. 18, 1969 Great Britain.................... 56331/69

[52] U.S. Cl....................... 106/56, 161/170, 264/29
[51] Int. Cl............................................ C04b 35/52
[58] Field of Search. 106/56; 264/29; 423/445, 447, 423/448; 161/170

[56] References Cited
UNITED STATES PATENTS

| | | | |
|---|---|---|---|
| 3,301,742 | 1/1967 | Noland et al. | 264/29 |
| 3,462,289 | 8/1969 | Rohl et al. | 264/29 |
| 3,462,340 | 8/1969 | Hough | 264/29 |
| 3,367,812 | 2/1968 | Watts | 423/448 |
| 3,470,003 | 9/1969 | Waylett | 106/56 |
| 3,672,936 | 6/1972 | Ehrenreich | 264/29 |

*Primary Examiner*—James E. Poer
*Attorney, Agent, or Firm*—Samuel Scrivener et al.

[57] ABSTRACT

Chemically resistant bodies of high mechanical strength are obtained by first producing a composite body in which partly-fired carbon-fibre material, made by low-temperature firing of natural or synthetic organic fibre material in an oxidising atmosphere while restraining the fibres from shrinking is incorporated in a matrix of carbonisable thermosetting resin and then heat-treating this body to carbonise the material of the matrix and at the same time complete the conversion of the organic precursor fibres into carbon-fibres. The heat treatment may be carried on to a temperature sufficient to convert the resin of the matrix into vitreous carbon, but greater mechanical strength though somewhat reduced chemical resistance may be obtained by use of carbonisation temperatures which though well above the curing point of the resin are below the temperatures necessary for the production of vitreous carbon. The use of a resin for the matrix whose shrinkage during the carbonising heat treatment is less than that of unrestrained partly-fired carbon fibres results in the production of a carbon-fibre reinforced carbon body in which the fibres are under tensile stress while the material of the matrix is under compressive stress.

5 Claims, No Drawings

CARBONACEOUS BODIES

This Application is a continuation-in-part of our Patent Application Ser. No. 59,017 filed July 28, 1970, now abandoned.

This invention relates to carbonaceous bodies in which carbon-fibre material is embedded in a carbonaceous matrix. Such bodies will hereinafter be called carbon-fibre reinforced carbon bodies, and the invention has for an object to provide carbon-fibre reinforced carbon bodies of improved physical characteristics. Another object is to provide a novel method of making such improved carbon-fibre reinforced carbon bodies.

The invention provides a carbon-fibre reinforced carbon body in which the carbon fibres are under tensile stress so as to place the material of the matrix under compressive stress. The term "fibres" in this specification is intended to be broad enough, when compatible with its context, to include so-called whiskers.

While in theory bodies of this kind may be produced by placing carbon fibres under longitudinal tension by mechanical means and maintaining them under such tension while embedding them in a resinous matrix and while this matrix is converted into a carbonaceous matrix, such a method of manufacture would in practice be at least extremely difficult to carry out, more particularly in view of the high temperatures involved. It is therefore another object of the invention to provide a novel or improved method for the manufacture of carbon-fibre reinforced carbon bodies in which the carbon fibres are under tensile stress.

At present in the practical manufacture of carbon fibre, organic precursor fibres, for example polyacrylonitrile fibres, are, in a first firing stage, fired at relatively low temperatures, generally below 300°C, in an oxidising atmosphere while being prevented from longitudinal shrinkage, whereby the fibres are tension-stretched during this first firing stage. This first firing stage is then followed by further firing, in the absence of oxygen, raising the temperature to, for example, 1,000°C to effect carbonisation, and during this further treatment no longitudinal restraint is imposed on the fibres; during this second stage the fibres undergo considerable shrinkage, and this stage is followed by further heating to temperatures of between 1,500°C and values above 2,500°C, still without longitudinal restraint, to improve the strength of the fibres obtained, then by a surface-roughening treatment to prevent the fibres from slipping in a resinous matrix when placed under longitudinal stress, and finally by a so-called wetting treatment necessitated by the curliness of the fully carbonised fibres. This process is described in some more detail in an article 'Carbon Fibres' by W.T. Gunston published on page 39 in the Feb. 1969 issue of Science Journal.

Precursor fibres which have been treated by the first firing stage only, and which have not been subjected to the above-mentioned further treatment, will hereinafter be referred-to as partly-fired carbon fibres, and one aspect of the present invention consists in a process for producing a carbon-fibre reinforced carbon body which comprises first incorporating partly-fired carbon fibres as hereinabove defined in a matrix of carbonisable resin and then subjecting the resulting composite body to further heat treatment to convert the resin of the matrix into carbonaceous material and to effect carbonisation of the partly-fired carbon fibres.

It will be readily appreciated that while when ready-made carbon fibres are embedded in a resinous matrix and the matrix is then heat-treated to convert it into carbonaceous material, the matrix will, during this conversion, undergo appreciable shrinkage, while no such shrinkage will occur in the material of the carbon fibres, since these were already fully carbonised when inserted. As a result the carbon fibres in the carbonaceous body thus produced will be under compressive stress, and the application of any tensile stress upon the composite body in the direction of the fibres will result in an appreciable tensile deformation of the matrix material before any part of the load is taken-up by the carbon fibres.

The method of the invention avoids this drawback by embedding in the carbonisable resin matrix fibres that are made from natural or synthetic organic fibres by subjecting such fibres to heat treatment in an oxidising atmosphere while substantially preventing the fibres from shrinking longitudinally during that heat treatment. The partly-fired carbon fibres, having been prevented from contracting during the first firing stage would, if unrestrained, undergo considerable shrinkage during the subsequent firing of the composite body, and provided that the material of the matrix is so chosen that its shrinkage during its carbonisation procedure is less than the unrestrained shrinkage of the carbon fibres, the excess in the shrinkage of the carbon fibres will result in tensile stressing of the carbon fibres, so as to impose a compressive stress upon the material of the matrix, and it will be readily appreciated that, by thus making use of differential shrinkages, a considerable measure of control can be achieved over the ultimate strength of the composite body. It has also been found that the partly-fired carbon fibres become firmly bonded in the matrix without requiring the bond-improving surface treatment to which carbon fibres have hitherto had to be subjected after the completion of their carbonisation. On the other hand it has been verified by experiments that the improved physical characteristics of the composite carbon body obtained by the incorporation of partly-fired carbon-fibre material in accordance with the present invention will not be obtained if raw precursor fibres, instead of partly-fired carbon-fibres, are incorporated in the resin matrix. This is believed to be due to one or more of the following facts: The partly-fired carbon-fibre material which according to the process of the invention is incorporated in the matrix has, before being incorporated in the matrix, undergone a firing process which involves oxidation, and which is accordingly carried out in an oxidising atmosphere. If raw precursor fibres are incorporated in a resinous matrix without having first been subjected to this oxidising first firing stage, the matrix prevents the access of oxygen to the fibres and thus prevents the firing from producing upon the fibres the effect of the first firing stage. Moreover, the organic fibre material, not having been subjected to such first firing stage, would be chemically very similar to the material of the matrix, and the fibres would therefore be liable to merge with the matrix during the heat treatment, thus preventing the maintenance of two distinct phases, namely matrix and fibres respectively, in the carbon body eventually produced.

The carbon fibres may be arranged in a particular way or direction in the resin so as to provide anisotropic properties if these are required in the finished carbon body.

In one specific form of the invention, the heat treatment is so conducted as to convert the phenolic resin into vitreous carbon.

Vitreous carbon is prepared by the thermal degradation of certain phenolic resins. The resin is shaped by any of the processes available for forming thermoset resins, and which include shaping by compression and transfer moulding, extrusion and casting. The cured item is then subjected to carbonisation on a carefully controlled heating schedule. This may include a first stage carried out in an inert atmosphere to a temperature of 900°C, and followed by a further stage carried out to 1,800°C in vacuo. The carbon as so produced has many useful properties but is not very strong. Its properties are isotropic, and it can be used in air at temperatures up to 600°C without appreciable loss in weight. The properties are described in the Journal of Materials Science 1967, p. 507–512, and we have found that in practice its cross-breaking strength varies between 15,000 and 25,000 p.s.i.

The present invention permits, by incorporating in the resin before its curing and carbonisation, partly-fired carbon-fibres, to obtain a carbon-fibre reinforced vitreous-carbon body of greatly improved physical strength.

According to a modification of this process the heat treatment after the curing may be terminated at a temperature which, while higher than the normal curing temperature, is lower than the temperature of about 1,800°C at which the formation of vitreous carbon is completed. Because the process of the present invention includes the formation of reinforcing carbon fibres in situ from the partly-fired carbon fibres inserted into the resin, the firing of the body must, however, be carried on to a temperature sufficient to continue the conversion of the precursor fibres into carbon fibres to a stage at which the resultant fibres have gained acceptable strength, the carbonisation of the fibres and of the matrix taking place at the same time. A temperature of at least about 850°C is believed to be required for this purpose. In this manner it is possible to obtain a composite body of even greater strength which additionally has at least some of the desirable properties of vitreous carbon.

According to yet another alternative the heat treatment may be carried on above the temperature at which the formation of vitreous carbon is completed.

The invention will be further described with reference to the following examples of the method:

EXAMPLE I

In order to produce carbon-fibre reinforced vitreous carbon, a layer of aligned partly-fired high-modulus carbon fibres is laid-out in the form of a mat in a tray coated with polypropylene sheet and this mat is soaked with a solution of 40 percent formaldehyde. Excess of the solution is poured off and a solution of novolak resin with a phenol formaldehyde ratio of 1:1 is added to cover the layer of carbon fibres.

A proportion of methanol may be added to the original solution of novolak resin for the purpose of diluting the resin to ensure wetting of the fibres, and it is believed that this also serves to improve bonding of the resin to particular points on the carbon molecule. Additional layers of fibres are positioned on top of this first layer, and each of these layers is covered with a layer of the same novolak resin.

The tray is then heated to a temperature of 90°C for 24 hours, during which time the fibres are allowed to settle under the influence of gravity, whereafter excess resin is poured off, leaving just sufficient resin to completely cover the fibre layers. The resin is then cured by heating on a schedule to 160° for 7 days. If the fibres are randomly oriented, a loading of 40 percent is likely to be achieved and if all fibres are oriented in the same direction, the loading can be increased to approximately 50 percent of the total weight. The fibre composite is then heated to selected temperatures above the normal curing temperature of the resin to form vitreous carbon.

The following heating cycle, which has been found to be particularly suitable for carbonising resin bodies according to the invention, is conducted in a furnace in two stages. For the first stage a furnace atmosphere of an inert gas is employed, and in the second stage the articles in the furnace are placed under vacuum.

FIRST STAGE — Inert Gas
Heating schedule of furnace:
Furnace temperature:
100 — 160°C in 24 hours
160 — 190°C in 24 hours
190 — 280°C in 24 hours
280 — 340°C in 24 hours
340 — 380°C in 24 hours
380 — 410°C in 24 hours
410 — 420°C in 24 hours
420 — 440°C in 24 hours
440 — 510°C in 24 hours
510 — 600°C in 24 hours
600 — 750°C in 24 hours
750 — 890°C in 24 hours
890 — 300°C in 24 hours
300 — 40°C in 24 hours This 14-day schedule may be modified to 7 or 28 days by halving or doubling the time intervals, according to the thickness of material to be furnaced.

SECOND STAGE — Vacuum

Heating from ambient temperature to 1,800°C is effected in 3 days and is followed by cooling. This schedule remains the same for 7, 14, or 28 days first-stage schedules.

A vitreous carbon body which was prepared in this manner with a 50 percent loading of partly-fired high-modulus carbon fibres had a transverse strength of 50,000 p.s.i. compared with only 30,000 p.s.i. for a body similarly prepared with the use of fully fired carbon fibres and with 15,000 to 25,000 p.s.i. for a body made from unloaded resin, and the matrix of the body had sufficient elasticity to withstand 0.7 percent strain before fracture. The body was capable of being used in air at temperatures up to 600°C without appreciable loss of weight.

EXAMPLE II

A composite body formed of phenol-formaldehyde resin with a loading of 50 percent by weight of partly-fired oriented Modmor high-modulus carbon fibres obtained from Morgan Crucible Company and having an ultimate tension strength of 2 to 3 × $10^5$ p.s.i. was prepared in the manner described in Example I and heat-treated by following the first stage of the heating cycle described in Example I, i.e., up to the indicated temperature of 890°C, no second stage being employed. The composite carbon body obtained according to this Example had a cross-breaking strength of 65,000 p.s.i. three-point test according to B.S.I. 598/1949, compared with a strength of 50,000 p.s.i. for the carbon-fibre reinforced prestressed vitreous carbon body obtained by the method of Example I, and with respective breaking strengths of 38,000 and 30,000 p.s.i. for carbon bodies in which the heat treatment of Example II was applied respectively to a resin body having a 50 percent loading of fully fired carbon fibres and to an unloaded resin body. The body, while less resistant to oxidation than vitreous carbon, could be used at a temperature of 300°C compared with a maximum of about 150°C for normal carbon-fibre-reinforced epoxy resin.

The foregoing description of embodiments of the invention has been given by way of examples only and a number of modifications may be made without departing from the scope of the invention. For instance, instead of using a novolak resin for forming the resin body, it would be possible to use a resin catalysed by a different process such as a resole resin or even a resin polymerised without use of a catalyst.

What we claim is:

1. A process for producing a carbon-fibre-reinforced carbon body, which comprises: first producing a composite body having a matrix of carbonisable cured resin in which fibres that are made from natural or synthetic organic fibres by subjecting such fibres to a first heat treatment up to a first temperature in an oxidising atmosphere while substantially preventing the fibres from shrinking longitudinally during that heat treatment, are incorporated, and then subjecting the said composite body to carbonising heat treatment up to a second, higher temperature in the absence of oxygen to convert the resin of the matrix into carbonaceous material and carbonise the fibres that are incorporated in said matrix.

2. A process as claimed in claim 1, wherein the said first temperature is about 300°C, and wherein the composite body is produced by adding to the fibres a phenolic resin in flowable form and then curing the resin to form a solid resin matrix in which the fibres are embedded.

3. A process as claimed in claim 2, wherein the carbonising heat treatment is so conducted as to convert the cured phenolic resin into vitreous carbon.

4. A process as claimed in claim 3, wherein the carbonising heat treatment is carried on to a temperature substantially above 1,800°C.

5. A process as claimed in claim 1, wherein the carbonising heat treatment is carried on to a temperature of about 900°C.

* * * * *

Notice of Adverse Decision in Interference

In Interference No. 99,132, involving Patent No. 3,790,393, F. C. Cowland and H. Appleby, CARBONACEOUS BODIES, final judgment adverse to the patentees was rendered Aug. 31, 1976, as to claim 1.

[*Official Gazette November 30, 1976.*]